(No Model.)
T. & T. E. RYAN.
T. RYAN, administrator of T. E. RYAN, dec'd.
LATHE TOOL.
No. 312,223. Patented Feb. 10, 1885.
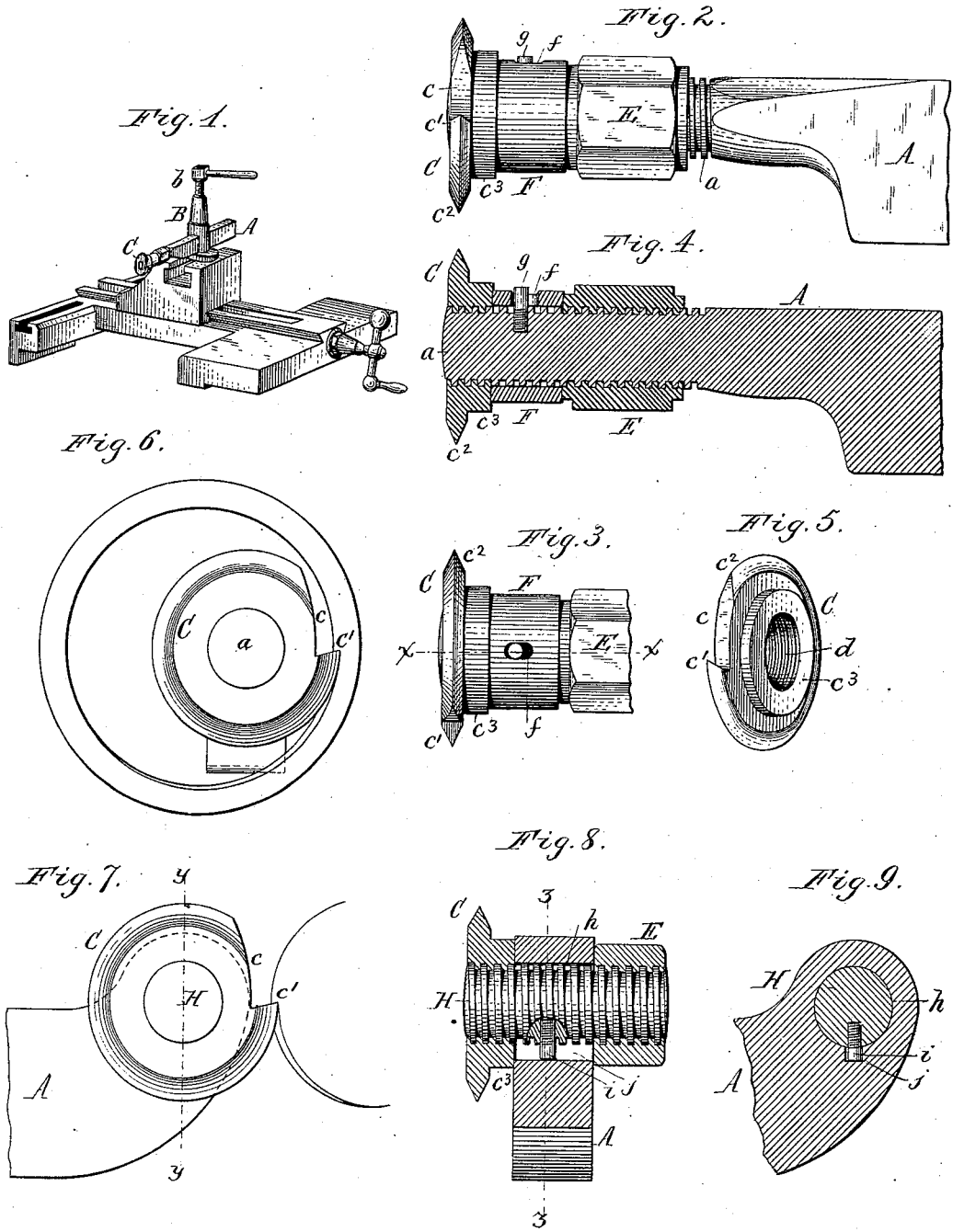
Witnesses:
Chas. J. Buchheit.
Theo. L. Popp.
Inventors:
Thomas Ryan
Thomas E. Ryan
By Wilhelm & Bonner
Attorneys.

UNITED STATES PATENT OFFICE.

THOMAS RYAN AND THOMAS E. RYAN, OF LOCKPORT, NEW YORK; SAID THOMAS RYAN ADMINISTRATOR OF SAID THOMAS E. RYAN, DECEASED.

LATHE-TOOL.

SPECIFICATION forming part of Letters Patent No. 312,223, dated February 10, 1885.

Application filed May 14, 1884. (No model.)

*To all whom it may concern:*

Be it known that we, THOMAS RYAN and THOMAS E. RYAN, of Lockport, in the county of Niagara and State of New York, have invented a new and useful Improvement in Lathe-Tools, of which the following is a specification.

This invention relates more particularly to that class of lathe-tools which consist of notched circular cutters, and are employed for cutting screw-threads and other grooves, and which are secured to the tool-post of the lathe by means of a carrying-bar.

The object of our invention is to provide a simple and efficient means for securing a circular cutter to its carrying-bar, so that the cutter can be readily adjusted on or removed from the bar when desired.

Our invention consists to that end in the improvements which will be hereinafter described, and pointed out in the claims.

In the accompanying drawings, Figure 1 represents a perspective view of a tool-post provided with our improved tool. Fig. 2 is a side elevation of our improved lathe-tool. Fig. 3 is a top plan view thereof. Fig. 4 is a longitudinal section in line $x\ x$, Fig. 3. Fig. 5 is a perspective view of the cutter. Fig. 6 is an end view of our improved lathe-tool in the act of cutting an internal screw-thread. Fig. 7 is a similar view showing the manner of securing the cutter to the holder for cutting an external thread. Fig. 8 is a vertical cross-section in line $y\ y$, Fig. 7. Fig. 9 is a vertical cross-section in line $z\ z$, Fig. 8.

Like letters of reference refer to like parts in the several figures.

A represents the carrying-bar, which is secured in a mortise in the tool-post B by a set-screw, $b$, in the usual manner. The bar A is provided at one end with a screw-shank, $a$, to which is secured the cutting-tool C. The cutter C consists of a circular disk of steel provided in its periphery with a notch or recess, $c$, forming a cutting-edge, $c'$. The circumferential edges of the disk may be made V-shaped, as shown at $c^2$, or of any other desired form in cross-section. The cutter C is provided with a central screw-threaded opening, $d$, whereby the cutter is secured to the threaded shank $a$ of the carrying-bar A. The cutter C is preferably provided with a hub or enlarged central portion, $c^3$, whereby a larger bearing-surface is formed between the cutter and the carrying-bar.

E represents a screw-nut which works on the threaded shank $a$ of the bar A, and F is a sliding sleeve or collar interposed between the cutter C and the nut E on the shank $a$.

$f$ is a slot formed lengthwise in the sleeve or collar F, and $g$ is a pin secured to the bar A, and projecting into the slot $f$, whereby the sleeve or collar is held from turning on the shank $a$, and its longitudinal movement is limited. The cutter C being applied to the threaded shank $a$ of the bar A, it is firmly secured thereon and held from turning by the sleeve F, which is forced or clamped against the inner side of the cutter by the screw-nut E. The frictional contact between the contiguous sides of the cutter C and sleeve F effectually prevents any rotation of the cutter, so that the cutting-edge is held firmly in position with reference to the piece of work operated upon.

When it is desired to remove the cutter C for the purpose of sharpening its cutting-edge, the screw-nut E is turned sufficiently to release the sleeve F from frictional contact with the side of the cutter, when the latter can be readily unscrewed from the shank, and when replaced thereon it is easily adjusted to its proper position by tightening the screw-nut E. In this manner the cutter is secured to the end of the bar A, thereby enabling the cutter to be inserted into the bore of the cylinder or tube for cutting an internal screw-thread in the same.

When it is desired to cut an external screw-thread, the cutter is preferably secured to one side of the carrying-bar, as shown in Figs. 7 and 8. The cutter is secured to the bar in this position by means of a screw-threaded shank, H, which passes through a smooth or unthreaded opening, $h$, in the end of the bar. The shank H has a free movement in the opening $h$ in the direction of its length, but is prevented from turning therein by means of a pin, $i$, secured to the shank and projecting into a longitudinal groove, $j$, formed in the opening $h$. The cutter C is screwed upon the shank H on one side of the bar A, and the screw-nut E is screwed to the shank H on the opposite side of the bar. By tightening the nut E against the bar A the cutter C is drawn tightly against the opposite side of the bar and firmly clamped in the desired position. By a slight turn of the screw-nut in the opposite direction the tool is released, when it can be readily unscrewed.

The same effect which is produced in the construction represented in Figs. 2, 3, and 4 by the sliding sleeve interposed between the screw-nut and the cutter is produced in the construction represented in Figs. 7, 8, and 9 by the sliding screw-shank in the carrying-bar. In the latter case the carrying-bar is interposed between the screw-nut and the cutter, and the same longitudinal movement of the screw-shank with reference to the part inclosing it is obtained in both cases.

We claim as our invention—

1. The combination, with a notched circular cutter having a central screw-threaded opening, of a screw-threaded supporting-shank, a screw-nut applied to said shank, a sleeve or collar surrounding said shank between the cutter and the screw-nut, and a pin which permits relative longitudinal movement of the sleeve or collar and screw-shank, but prevents relative rotative movement of these parts, substantially as set forth.

2. The combination, with the carrying-bar having a screw-shank, $a$, provided with a pin, $g$, of the notched cutter C, having a central screw-threaded opening, a screw-nut, E, and a sleeve, F, arranged on said shank between the cutter and the nut, and having a longitudinal slot, $f$, into which the pin $g$ projects, substantially as set forth.

Witness our hands this 3d day of May, 1884.

THOMAS RYAN.
THOMAS E. RYAN.

Witnesses:
W. P. DAVISON,
A. L. DAVISON.